United States Patent [19]

Delaney

[11] Patent Number: 4,909,945

[45] Date of Patent: Mar. 20, 1990

[54] METHOD FOR INCREASING THE SIZE OF ELEMENTAL SULFUR PARTICLES PRODUCED BY A HYDROGEN SULFIDE REMOVAL PROCESS

[75] Inventor: Dennis D. Delaney, Yorba Linda, Calif.

[73] Assignee: Union Oil Company of California, Brea, Calif.

[21] Appl. No.: 226,408

[22] Filed: Jul. 29, 1988

[51] Int. Cl.$^4$ ............................ C02F 1/24; C01B 17/05
[52] U.S. Cl. ..................................... 210/705; 210/712; 210/721; 210/734; 423/226; 423/567 R; 423/573.1
[58] Field of Search ................................ 210/703–707, 210/710, 712, 718, 721, 733–735, 916; 423/220, 221, 226, 567 R, 567 A, 573 R, 573 G

[56] References Cited

U.S. PATENT DOCUMENTS

| | | |
|---|---|---|
| 3,975,269 | 8/1976 | Ramirez ............................ 210/707 |
| 4,108,768 | 8/1978 | Sebelik et al. ..................... 210/705 |
| 4,152,307 | 5/1979 | Shibahara et al. ............... 210/734 X |
| 4,217,209 | 8/1980 | Steffan et al. ..................... 210/734 |
| 4,534,955 | 8/1985 | Rosenbaum ..................... 210/704 X |
| 4,603,035 | 7/1986 | Connell et al. ..................... 423/226 |
| 4,666,695 | 5/1987 | Baur et al. ....................... 210/721 X |

Primary Examiner—Tom Wyse
Attorney, Agent, or Firm—Arthur E. Oaks; Gregory F. Wirzbicki

[57] ABSTRACT

A method is provided for removing elemental sulfur particles from a hydrogen sulfide removal process which employs a regenerable, aqueous washing solution capable of absorbing hydrogen sulfide from an industrial gas stream and converting that hydrogen sulfide to elemental sulfur. The washing solution of such a process is contacted with bubbles of an oxygen-containing gas while in the presence of an effective amount of a cationic sulfur particle-size increasing polymeric flocculent to form a sulfur-containing froth from which the sulfur is recovered.

39 Claims, 1 Drawing Sheet

METHOD FOR INCREASING THE SIZE OF ELEMENTAL SULFUR PARTICLES PRODUCED BY A HYDROGEN SULFIDE REMOVAL PROCESS

BACKGROUND OF THE INVENTION

1. Field of the Invention

The present invention relates to the removal of hydrogen sulfide from gas streams with an aqueous washing solution and, more particularly, to a method for increasing the size of sulfur particles which are removed from the washing solutions of hydrogen sulfide removal processes wherein absorbed hydrogen sulfide is converted to elemental sulfur.

2. Description of the Prior Art

With the increasing concern over atmospheric pollution and the concomitant increasingly strict enforcement of ever more stringent air pollution standards, greater responsibility is being placed on industry to produce pollution-free products in a non-polluting manner. One area of particular concern in the past, and still today, is the discharge or release of sulfur and its compounds, especially hydrogen sulfide ($H_2S$), into the atmosphere as a result of a number of industrial processes. These processes include, for example, petroleum refining, the roasting or smelting of various sulfide containing ores, the sweetening of sour natural gas, destructive distillation of coal and oil shale, gasification or liquefaction of coal, and the production and use of $H_2S$-containing geothermal steam and liquid for generating electricity and for other uses.

Several, processes have been developed, and are in relatively common use, for removing $H_2S$ from gas streams such as those generated or encountered in the industrial processes listed above. One such hydrogen sulfide removal process is the Stretford process, which employs an aqueous, alkaline washing solution to preferentially absorb and oxidize $H_2S$ therein. Absorption is done with a water-soluble organic alkaline agent, such as anthraquinone disulphonic acid (ADA), with the hydrogen sulfide being oxidized to particles of elemental sulfur by a pentavalent vanadium compound such as sodium vanadate ($NaVO_3$) Recovery of the sulfur is accomplished by flotation, using a stream of air which is injected into the process solution. This generates a frothy slurry containing the sulfur particles which rises to the top of the solution where it is skimmed off, with the sulfur therein being recovered therefrom by filtration or other liquid/solid separation techniques. In this process, the oxygen in the injected air also serves to reoxidize the reduced vanadae ions and thus regenerate the solution for reuse in the process.

There are a number of other processes commercially available to perform such sulfur oxidation and recovery. One of these is the Unisulf process, which is described by Fenton et al. in U.S. Pat. No. 4,283,379, the disclosure of which is incorporated herein by reference in its entirety. In this process, the washing solution comprises a solubilized vanadium salt as the oxidizer, a no-quinone aromatic absorption compound, thiocyanate ions, and a water-soluble carboxylate complexing agent. Other processes are based on the use of other metallic oxidizers such as ferric iron and soluble arsenates.

A commonly used technique to remove the sulfur particles is by circulating the washing solution through a tank-like oxidizer vessel, through which air is bubbled to regenerate said washing solution and form said frothy slurry. With fresh, unused solutions, the elemental sulfur particles which, when formed, have an average diameter in the range between about 0.5 and 5.0 microns, agglomerate to form sulfur clumps of about 10 to about 150 microns in size. Particles of this size are readily buoyed up to the surface in the aforementioned froth and pass through a weir-like opening near the top of the vessel into a sulfur collection vessel. Here, the bubbles in the froth readily collapse, and the resultant liquid suspension or slurry can be easily pumped to a sulfur separation device such as roary vacuum filter, filter press or centrifuge, from which, after washing to remove the entrained process solution, an extremely pure grade sulfur is obtained. Where a nonparticulate form of sulfur is desired, the washed filter cake may be sent to an autoclave or other sulfur melter.

One problem which has plagued the operators of all such processes is that of efficiently removing the elemental sulfur particles from the circulating washing solution. Inefficient sulfur particle removal causes an unwanted buildup in the concentration of such particles within the washing solution, which, in turn, raises the total mass of the suspension being circulated, thus increasing pumping expenses. Secondly, as the sulfur concentration increases, it is found that some of the particles drop out of suspension, particularly in areas of high centrifugal force such as sharp bends in the associated plumbing. The resultant formation of deposits can cause partial and, in extreme cases, total plugging of the circulation system, thereby further increasing pumping expenses and often forcing a complete, and usually unschedule, shutdown of operations. In addition, large quantities of circulating sulfur particles will eventually cause other significant problems due to both corrosion and erosion in the circulation piping, pumps and other components of the plant acility. The presence of these particles also acerbates a tendency of older solutions to foam. Foams, which have high liquid-to-air ratios and generally very small bubble sizes, as compared to froths, which have larger bubbles and a relatively low liquid content, are very poor vehicles for transferring sulfur out of the oxidizer vessel. As a result, foams leave an inordinate amount of small particles circulating with the washing solution. Lastly, circulating sulfur particles in high concentrations can react with various washing solution constituents and accelerate the normal buildup of nonregenerable contaminants such as sodium thiosulfate and sodium sulfate. When the levels of such contaminants reach sufficiently high levels, the vanadium-containing solution becomes unusable and usually must be disposed of by deep well injection, or by sending it to a hazardous waste landfill, with resulting high costs and potential liability for future cleanups.

It is known that, after the washing solution has been in use for some length of time, the overall effectiveness of sulfur removal by the above described technique begins to degrade. This is believed to result from the normal buildup of sulfates and thiosulfates along with contaminant salts such as colloidal metal oxysulfides and, particularly in the Stretford process, ADA oxidation products. These materials are believed to inhibit the agglomeration of the initially formed small sulfur particles into larger clumps as herein above described. Small particles are not easily floated up to the surface by bubbled air and thus have a greater tendency to stay suspended in the circulating washing solution than do larger sized particles, with all the problems noted above.

Even when they are floated out of the system in the froth, these small (i.e., under 5 microns in diameter) particles frequently require a considerable amount of wash water to completely remove the last traces of washing solution from them. This situation occurs because sulfur particles are normally hydrophilic and, therefore, readily wetted by the washing solution. As a result, some amount of solution is adsorbed onto the surfaces of these particles and carried out with them. This loss is in addition to that resulting from removing the froth. Where, for same reason, the aforesaid agglomeration has, in whole or in part, failed to occur, the relatively large surface-to-volume ratio of these unagglomerated particles will cause the amount of solution so adsorbed and carried out to be quite large. In extreme cases, the amount of washing solution carried out is large enough that the resultant sulfur is too contaminated for most, if not all, commercial use and, thrrefore, must, under current EPA regulations, be discarded at a hazardous waste dump.

There is therefore a need for a technique for increasing the size of sulfur particles produced in thiosulfate and sulfate salt contaminated, regenerable aqueous washing solutions used in processes wherein absorbed hydrogen sulfide is converted to elemental sulfur. In the present invention, such a technique has been found.

SUMMARY OF THE INVENTION

Briefly the present invention provides a method for the efficient recovery o sulfur in a process in which an $H_2S$-containing gas stream is contacted with a regenerable, aqueous washing solution so as to preferentially absorb hydrogen sulfide from the stream. The absorbed $H_2S$ is converted into elemental sulfur by reaction with an oxidizing agent contained in said solution. Thereafter, the treated gas stream is exhausted from the system and the sulfur-containing washing solution is oxidatively regenerated by a stream of air, said air acting to create a froth which floats the sulfur to the surface for removal. The method of the present invention comprises admixing said circulating washing solution with an effective amount of one or more cationic sulfur particle-size increasing polymeric flocculents, preferably just prior to the oxidation/flotation stage of said process. When used, such materials cause the small sulfur particles therein to quickly agglomerate to form larger, more floatable, particles. This results in a substantial reduction in the amount of washing solution carried out on the particle surfaces and, at the same time, produces a relatively cleaner, purer sulfur product than is produced by prior art methods.

BRIEF DESCRIPTION OF THE DRAWINGS

The invention will be readily understood by reference to the drawings, wherein like numerals refer to like elements and in which.

DETAILED DESCRIPTION OF THE INVENTION

Figure 1:
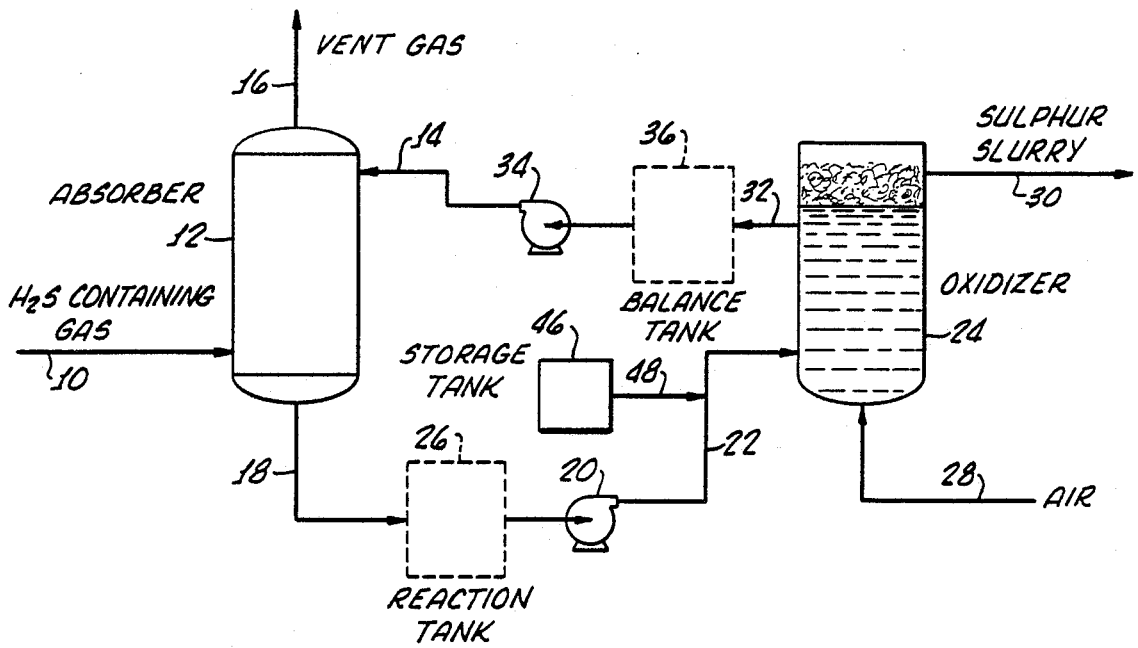
FIG. 1 is a schematic flow diagram illustrating a Stretford type process in which a hydrogen sulfide containing gas stream is treated, said process being modified by the method of the present invention.

FIG. 1 is a schematic illustration of a modified Stretford type plant and process for oxidizing $H_2S$ occurring in a wide variety of gas streams. Such streams may originate from one or more of the operations involved in the refining of petroleum, the sweetening of sour natural gas, the processing of sulfide-bearing ores, the destructive distillation of oil shale and/or coal, the gasification or liquefaction of coal, the use of geothermal fluids to generate electricity and many other industrial processes. Most of the processes conforming to the general scheme of FIG. 1 can successfully treat gas streams containing from less than one mole percent to as much as 80 mole percent $H_2S$. One such gas stream is that produced by the hydrogenation and hydrolysis of a Claus process tail gas, as disclosed by Beavon in U.S. Pat. No. 3,752,877. Such a gas will typically contain from about 0.5 to about 5.0 mole percent hydrogen sulfide, from about 2 to about 15 mole percent carbon dioxide, from about 5 to about 30 mole percent water, and traces of methane, carbonyl sulfide and methyl mercaptan, with the remainder being nitrogen.

In the process of FIG. 1, the hydroge sulfide-containing gas is introduced, through conduit 10, into a lower portion of absorber 12, said gas flowing upwardly in countercurrent contact with a process solution introduced, through conduit 14, into an upper portion of absorber 22. In so doing, substantially all of the $H_2S$ is removed from the gas by the downwardly flowing solution thereby forming an essentially $H_2S$-free vent gas which is discharged through conduit 16. While an absorber employing counter-current flow has been described, it is understood that other known gas/liquid contacting equipment such as a venturi scrubber may also be employed for this purpose. Other suitable equipment includes single and multistage contacting tanks using countercurrent and/or concurrent flow of the gas stream and washing solution.

Once absorbed by the process solution, the $H_2S$ is converted to elemental sulfur by reaction with the oxidizing constituent of the solution. The "reduced" solution and entraine elemental sulfur are withdrawn from absorber 12 via conduit 18 and pumped by pump 20 through conduit 22 into the bottom of oxidizer vessel 24. Prior to the introduction of the reduced solution into oxidizer vessel 24, sufficient time should be allowed for the complete conversion of the absorbed $H_2S$ into elemental sulfur. The exact amount of time required for this to happen is a function of the particular chemistry and the overall efficiency of the sulfide oxidation process. A typical time period for such conversion is about 5 minutes, which can often be provided by uitably adjusting the total residence time of the circulating solution within absorber 12. Optionally, where longer residence times are required, reaction vessel 26 may be provided to hold the solution for enough time to allow the sulfide/sulfur conversion to be completed. Normally, it is during this time that the small (about 0.5 to about 5.0 micron) sulfur particles agglomerate into the larger (about 10 to about 150 micron) particles which are found to be optimum for subsequent recovery operations. In a typical operating plant, the sulfur concentration in the solution entering the oxidizer vessel is between about 1 to about 5 weight percent.

The contents of oxidizer vessel 24, i.e, reduced solution and elemental sulfur particles, are contacted with air or other molecular oxygen-containing gas, at a temperature of between about 80° to about 140° F., which is introduced through conduit 28 into the bottom of oxidizer vessel 24. The entering air is preferably in the form of small bubbles which may be formed by introducing said gas through a sparger (not shown) preferably accompanied by a vigorous churning of the solution with a high-shear rotating stirrer adapted for this purpose (also not shown). This quickly promotes intimate contact between the oxygen in the air bubbles and the circulating solution so that the reduced vanadium is swiftly reoxidized and the solution regenerated. These small air bubbles also attach themselves to the entering sulfur particles, thereby causing them to float to the top of oxidizer vessel 24, where a frothy slurry is formed. This is drawn off, via conduit 30, for recovery. The now desulfurized, regenerated solution is removed from oxidizer vessel 24 via conduit 32, and reycled by pump 34 back into absorber 12 via conduit 14. Optionally, balance vessel 36 is provided as an accumulator surge tank for the thus regenerated solution. Make-up chemicals, when required, can also be added at this point.

Figure 2:
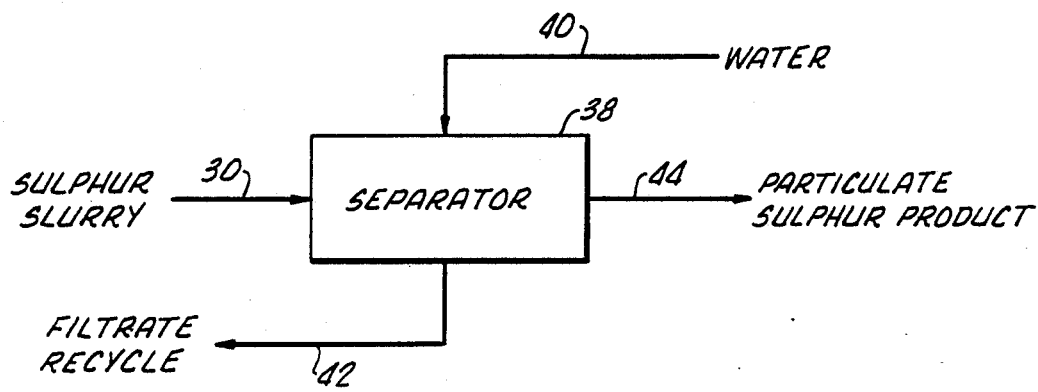
FIG. 2 illustrates a method for separating the product sulfur from a sulfur slurry produced in the process illustrated in FIG. 1.

The frothy sulfur slurry, which typically contains from about 15 to about 20 weight percent elemental sulfur, is withdrawn from oxidizer vessel 24 via conduit 30 for separation and recovery. FIG. 2 illustrates a typical recovery scheme. Here, the slurry is fed, via conduit 30, into liquid/solid separator 38, which can be a vacuum filter, entrifuge, or other device capable of separating sulfur particles from an aqueous slurry in much the same manner. The separated sulfur is washed with water introduced via conduit 40, with the filtrate, comprised of elutd washing solution and wash water, being withdrawn via conduit 42. The now washed, purified sulfur product is withdrawn from separator 38 via conduit 44 as a relatively dried cake comprised of finely divided particles. Te particulate sulfur produced by this process typically achieves a purity on the order of 99+ percent, often as high as 99.9+ percent. A particulate product of such purity is suitable for all uses, including agricultural use, without further purification. Where desired, the cake can be fed into a melter (not shown), which produces molten sulfur and separates by gravity and/or evaporation any wash water carried therein.

In the present invention, it has been found that all of the problems noted above as being caused by an excessive amount of small, unagglomerated sulfur particles are avoided when an effective amount of one or more water-based, cationic, sulfur particle-size increasing polymeric flocculents, preferably introduced into the solution as it is entering oxidizer vessel 24, is used. When this is done, it is observed that, even with solutions containing relatively large amounts of thiosulfate and other solution contaminants, the froth quickly shows a much higher percentage of larger, more floatable particles than before such introduction. Further, the amount of adsorbed washing solution carried out with the particles is reduced.

The flocculents used in this invention preferably comprise those polymers which are (1) substantially stable at the conditions existent within the washing solution, (2) substantially innocuous to the oxidation of hydrogen sulfide to sulfur, (3) substantially innocuous to the regeneration of the washing solution with oxygen, (4) substantially innocuous to the recovery of product sulfur, (5) substantially nonreactive or decomposable within the washing solution except in cases where essentially all products of such reaction and/or decomposition are substantially innocuous to the environment and (6) substantially innocuous to said hydrogen removal system.

As used herein, the phrase "innocuous to the environment" means: will not cause or significantly contribute to air pollution or liquid waste disposal problems. The phrase "innocuous to the hydrogen sulfide removal system" means: will not interfere with the oxidation of hydrogen sulide to sulfur, will not interfere with the regeneration of the washing solution with oxygen, will not interfere with the recovery of product sulfur, and will not, in practice, accumulate within the circulating washing solution to the point where it interferes with the oxidation of hydrogen sulfide, the regeneration of the washing solution or the recovery of the product sulfur.

It is found that only a few water-soluble cationic polymer flocculents meet all these preferred requirements. One group of compounds which do are polyminoacrylate quaternary ammonium "salts." Typically, such materials are copolymers of acrylamide, one or more quaternary ammonium alkyl acrylate esters of the general formula:

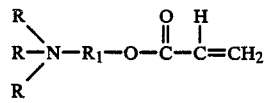

wherein each R group is independently an alkyl radical having from 1 to about 30 carbon atoms and preferably saturated aliphatic radicals having from 1 to about 10 carbon atoms and $R_1$ is a divalent alkyl radical having from 1 to about 5 carbon atoms, and, optionally, one or more esters of methacrylic acid wherein the esterifying moiety is a branched or unbranched alkyl group having from about 10 to about 20 carbon atoms, said copolymer having an average molecular weight above about 5 millio,, preferably above about 7 million. Two materials found to meet these criteria are sold under the designations DX-1077 by the Betz Chemical Company and SA-9010 by the Tretolite Corp.

It is also found that the amount of flocculent needed to accomplish these results is very small. While the amount required to be "effective" will vary according to the circumstances surrounding the need for its use, such an amount is typically sufficient to provide a flocculent concentration in the range between about 10 and about 1000 ppmv, preferably between about 20 and about 500 ppmv, and most preferably between about 50 and about 200 ppmv. When used in such concentrations, the average sulfur particle diameter is found to at least double, preferably triple and more preferably, to increase by a factor of 4 or more. Further, when used at these levels, little or no polymer buildup occurs within the washing solution. Rather, most of the flocculent is removed with the sulfur particles, with the polymer content thereof, after final washing, typically being on the order of about 0.50 pounds per ton of dry sulfur product (0.025 weight percent). With such low levels of polymer, the effect on the overall purity and utility of the final sulfur product is negligible. Since tthe polymers themselves are insoluble in the washing solution and are otherwise inert therein, any amount left behind will have no significant effect on the either the sulfide to sulfur conversion or solution regeneration aspects of the process used.

Addition of the flocculent t the process solution is quite simple. Although the process solution is aqueous, the polymers are normally mixed with water before use and such a mixture can be stored, at room temperature, in storage container 46, as shown in FIG. 1, until needed. Addition of the polymer mixture, via conduit 48, is preferably at a point just before conduit 22 enters oxidizer tank 24. When so added, the normal churning operation in oxidizer tank 24 provides an efficient and effective distribution throughout the mass of oxidizing washing solution, so that stable, large-particle containing froth is quickly formed. No other changes are required to the operating system.

The method of the present invention may be applied to a number of presently used sulfide oxidation processes conforming to the general description given above. While these processes, known commercially by such names as Stretford, Unisulf, Sulfolin, LoCat, Sulfurox and Hyperion, all vary in regard to the particular reactants and chemistry involved in H2S/sulfur conversion, the oxidation and frothing steps are all sufficiently similar that no special equipment, or procedures, other than those noted herein above are normally needed for such application.

Without wishing to bound thereby it is postulated that, in an aging or excessively contaminated washing solution, the sulfur particles therein start to develop a highly negative surface charge (i.e., the Zeta potential is greater than 20, typically 35 to 40). These negatively charged particles strongly repel each other, thus preventing them from agglmmerating to any significant degree. It appears that these polymers sufficiently reduce the level of negativity of the surface charges to permit the amount of agglomeration observed. There is also some evidence that the polymer tends to coat the the particles, acting as a binder for the particles and creating a barrier for the washing solution, so that much less of this solution will be adsorbed onto the particle surfaces. However all this happens, it is found that the aforementioned inhibition caused by contaminants in the circulating solution is effectively prevented, with normal sulfur particle agglomeration occurring, and solution losses are reduced.

The present invention is further illustrated by the following Example which is illustrative of various aspects of the invention and not intended as limiting the scope of the invention, as defined in the claims.

EXAMPLE

A sample of circulating washing solution having an average sulfur particle size of about 3.5 microns (as measured by a Microtrac laser light scattering particle size analyzer manufactured by Leeds and Northrup Instruments) and a thiosulfate concentration of about 35 g/1 (expressed as $Na_2S_2O_3.H_2O$), was taken from the oxidizer section of a commercial Unisulf plant of the type described hereinabove. To 500 CC of this solution wa added, with stirring at room temperature, over a 5-minute period, 100 ppmv of a cationic particle size increasing polymer flocculent, said flocculent being a copolymer of acrylamide, trimethyl quaternary ammonium ethyl acrylate and some amount of alkyl acrylate esters, said polymer having an average molecular weight of about 8,000,000 (Betz DX-1077). The resultant average sulfur particle size was 15.3 microns or better than a 4 times increase in the average particle diameter. The particle size distributions for the blank and treated samples are shown in the table below.

| Sulfur Diametric Particle Size Range (microns) | Blank Solution (Vol. %) | Treated Solution (Vol. %) |
| --- | --- | --- |
| over 62 | 0 | 0 |
| 44 to 62 | 0 | 0.6 |
| 31 to 44 | 0 | 3.0 |
| 22 to 31 | 0 | 16.3 |
| 16 to 22 | 0 | 21.2 |
| 11 to 16 | 0 | 20.0 |
| 7.8 to 11 | 5.1 | 18.4 |
| 5.5 to 7.8 | 2.0 | 9.8 |
| 3.9 to 5.5 | 23.0 | 6.4 |
| 2.8 to 3.9 | 31.6 | 3.3 |
| 1.9 to 2.8 | 20.1 | 1.0 |
| 1.4 to 1.9 | 12.3 | 0 |
| below 1.4 | 5.9 | 0 |

Note that 92.9% of the blank solution particles are 5.5 microns or lower in size, and 38.3% are below 2.8 microns in size. In the treated sample, the corresponding percentages are 10.% and 1.0%, with over half of these particles being in the range of 3.9 to 5.5 microns. Also note that 61.1% of the treated particles are above 11 microns in size, whereas none of the blank solution particles are this large.

COMPARATIVE EXAMPLE

The procedure of the Example was repeated using four commercially available water soluble flocculating polymers (SC-973, SC-3050, SC-4030 and SC-5020, all manufactured by the Tretolite Corporation). The chemical types, average molecular weights and average particle sizes produced, in microns, are as follows:

| | Chem. Type | Ave. M.W. | Ave. part. size |
| --- | --- | --- | --- |
| Blank | | | 3.5 |
| SC-930 | cationic: polymelamine | 1000 | 4.4 |
| SC-3050 | cationic: polyamine-quat. ammon. salt | 100,000 | 6.6 |
| SC-4030 | cationic: polyamine-quat. ammon. salt | 20,000 | 5.4 |
| SC-5020 | anionic: polyamine-quat. ammon. salt | 6,000,000 | 4.6 |

Note that none of these polymers produced as much as a 2X increase in the average sulfur particle size.

This invention may be embodied in other forms without departing from the spirit thereof. Consequently the present embodiments and examples are to be considered only as being illustrative and not restrictive, with the scope of the invention being indicated by the appended claims. All embodiments which come within the scope and equivalency of the claims are, therefore, intended to be embraced therein.

I claim:

1. In a method for removing particles of sulfur from a hydrogen sulfide removal system which employs a regenerable aqueous washing solution wherein said washing solution is circulated through an oxidizer vessel and therein an oxygen-containing gas is bubbled through said washing solution to form an upwardly rising sulfur particle containing froth above the liquid surface of said washing solution, the improvement comprising, admixing one or mrre cationic polymeric flocculents with said washing solution in an amount sufficient to at least double the average sulfur particle size in said froth.

2. The method of claim 1 wherein said polymeric flocculent is a copolymer of acrylamide and one or more quaternary ammonium alkyl acrylate esters of the formula:

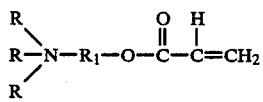

wherein each R group is independently an alkyl radical having from 1 to about 30 carbon atoms and R₁ is a divalent alkyl radical having from 1 to about 5 carbon atoms, and having an average molecular weight above about 5 million.

3. The method of claim 2 wherein said R groups are independently saturated aliphatic groups having from 1 to about 10 carbon atoms.

4. The method of claim 3 wherein said copolymer further comprises one or more esters of methacrylic acid, with the esterifying moiety being a branched or unbranched alkyl group having between about 10 and about 20 carbon atoms, and the average molecular weight is above about 7 million.

5. The method of claim 3 wherein the concentration of said flocculent within said oxdizer vessel is between about 20 and aout 500 ppmv.

6. The method of claim 3 wherein the concentration of said flocculent within said oxidizer vessel is between about 50 and about 200 ppmv.

7. The method claim 3 wherein the average sulfur particle size in said froth is at least increased by a factor of about 4.

8. The method of claim 1 wherein the flocculent comprises one or more polymers selected from the group consisting of cationic polymers which are:
    (1) substantially stable at the conditions existent within the washing solution,
    (2) substantially innocuous to the oxidation of hydrogen sulfide to sulfur,
    (3) substantially innocuous to the regeneration of the washing solution with oxygen,
    (4) substantially innocuous to the recovery of product sulfur,
    (5) substantially nonreactive or decomposable within the washing solution except in cases where essentially all products of such reaction and/or decomposition are substantially innocuous to the environment, and
    (6) substantially innocuous to said hydrogen removal system.

9. In a method for removing particles of sulfur from a hydrogen sulfide removal system which employs a regenerable aqueous washing solution wherein said washing solution is circulated through an oxidizer vessel and therein an oxygen-containing gas is bubbled through said washing solution to form an upwardly rising sulfur particle containing froth above the liquid surface of said washing solution, the improvement comprising admixing with said washing solution a polymeric flocculent comprised of a copolymer of acrylamide and one or more quaternary ammonium alkyl acrylate esters of the formula:

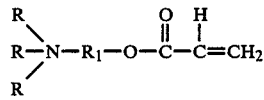

wherein each R group is independently an alkyl radical having from 1 to about 30 carbon atoms and R₁ is a divalent alkyl radical having from 1 to about 5 carbon aoms, said copolymer having an average molecular weight of at least 5 million.

10. The method of claim 9 wherein said R groups are independently saturated aliphatic groups having from 1 to about 10 carbon atoms.

11. The method of claim 10 wherein said copolymer further comprises an amount of one or more esters of methacrylic acid, with the esterifying moiety being a branched or unbranched alkyl group having between about 10 and about 20 carbon atoms and an average molecular weight of at least about 7 million.

12. The method of claim 10 wherein the concentration of said flocculent is between about 50 and about 200 ppmv.

13. The method of claim 10 wherein the average sulfur particle size is increased by a factor of about 4.

14. In a method for removing particles of sulfur from a hydrogen sulfide removal system which employs a regenerable aqueous washing solution wherein said washing solution is circulated through a oxidizer vessel and therein an oxygen-containing gas is bubbled through said washing solution to form an upwardly rising sulfur particle containing froth above the liquid surface of said washing solution, the improvement comprising admixing with said washing solution a cationic flocculent comprised of a copolymer of acrylamide and one or more quaternary ammonium alkyl acrylate esters of the formula:

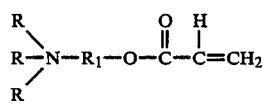

wherein each R group is independently an alkyl radical having from 1 to about 10 carbon atoms and R₁ is a divalent alkyl radical having from 1 to about 5 carbon atoms, and said polymer having an average molecular weight of at least 5 million, with the method being conducted so that the concentration of said flocculent remaining on said removed sulfur particles is no more than about 1 pound per ton of dry sulfur.

15. The method of claim 14 wherein the concentration of said flocculent remaining on said removed sulfur particles is no more than about 0.5 pounds per ton of dry sulfur.

16. In method for removing particles of sulfur from a hydrogen sulfide removal system which employs a regenerable aqueous washing solution wherein said washing solution is circulated through an oxidizer vessel and therein an oxygen-containing gas is bubbled through said washing solution to form an upwardly rising sulfur particle containing froth above the liquid surface of said washing solution, the improvement comprising, admixing one or more cationic polymeric flocculents with said washing solution in an amount sufficiet that no more than about 50% of said recovered sulfur particles have an average diametric particle size at or below about 5.5 microns.

17. The method of claim 16 wherein no more than about 20% of said recoved particles have an average diametric particle size at or below about 5.5 microns.

18. The method of claim 17 wherein no more than about 5% of said recovered particles have an average diametric particle size at or below about 2.8 microns.

19. The method of claim 17 wherein no more than about 1% of said recovered particles have an average diametric particle size at or below about 2.8 microns.

20. The method of claim 17 wherein at least about 60% of said recovered particles have an average diametric particle size at or above 11 microns.

21. The method of claim 16 wherein no more than about 10.8% of said recovered particles have an average diametric particle size at or below about 5.5 microns.

22. The method of claim 21 wherein no more than about 5% of said recovered particles have an average diametric particle size at or below about 2.8 microns.

23. The method of claim 21 wherein no more than about 1% of said recovered particles have an average diametric particle size at rr below about 2.8 microns.

24. The method of claim 21 wherein at least about 60% of said recovered particles have an average diametric particle size at or above 11 microns.

25. In a method for removing particles of sulfur from a hydrogen sulfide removal system which employs a regenerable aqueous washing solution wherein said washing solution is circulated through an oxidizer vessel and therein an oxygen-containing gas is bubbled through said washing solution to form an upwardly rising sulfur particle containing froth above the liquid surface of said washing solution, the improvement comprising, admixing one or more cationic polymeric flocculents with said washing solution in an amount sufficient that no more than about 50% of said recovered sulfur particles have an average diametric particle size at o below about 5.5 microns, with said recovered sulfur particles having a concentration of no more than about 1.0 pound of said flocculent per ton of dry sulfur.

26. The method of claim 25 wherein said flocculent comprises a copolymer of acrylamide and one or more quaternary ammonium alkyl acrylate esters of the formula:

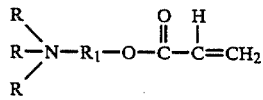

wherein each R group is independently a saturated aliphatic radical having from 1 to about 10 carbon atoms and $R_1$ is a divalent alkyl radical having from 1 to about 5 carbon atoms, and having an average molecular weight of at least about 5 million.

27. The method of claim 26 wherein said copolymer further comprises one or more esters of methacrylic acid, with the esterifying moiety being a branched or unbranched alkyl group having between about 10 and about 20 carbon atoms, and the average molecular weight of the copolymer is at least about 7 million.

28. The method of claim 27 wherein said admixed concentration is between about 10 and about 1000 ppmv.

29. The method of claim 28 wherein said admixed concentration is between about 50 and about 200 ppmv.

30. The method of claim 29 wherein said concentration of flocculent on said recovered sulfur particles is no more than about 0.5 pounds per ton of dry sulfur.

31. The method of claim 30 wherein no more than about 20% of said recovered sulfur particles have an average diametric particle size at or below about 5.5 microns.

32. The method of claim 31 wherein no more than about 10.8% of said particles have an an average particle size at or below about 5.5 microns.

33. The method of claim 32 wherein at least about 40% of said particles have an average diametric particle size at or above about 11.0 microns.

34. The method of claim 32 wherein at least about 50% of said particles have an average diametric particle size at or above about 11.0 microns.

35. The method of claim 32 wherein at least about 60% of said particles have an average diametric particle size at or above about 11.0 microns.

36. In a method for removing particles of sulfur from a hydrogen sulfide removal system which employs a regenerable aqueous washing solution wherein said washing solution is circulated through an oxidizer vessel and therein an oxygen-containing gas is bubbled through said washing solution to form an upwardly rising sulfur particle containing froth above the liquid surface of said washing solution, the improvement comprising admixing with said washing solution a cationic sulfur particle size increasing polymeric flocculent, said polymer comprising a copolymer of acrylamide, one or more quaternary ammonium alkyl acrylate esters of the formula:

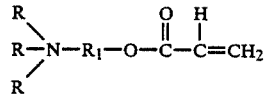

wherein each R group is independently a saturated aliphatic radical having from 1 to about 10 carbon atoms and $R_1$ is a divalent alkyl group having from 1 to about 5 carbon atoms, and one or more esters of methacrylic acid, with the esterifying moiety being a branched or unbranched alkyl group having between about 10 and about 20 carbon atoms, said copolymer having an average molecular weight of at least 7 million, said flocculent being present in said washing solution in a concentration between about 50 and 200 ppmv, said method being conducted so that average sulfur particle size is increased by a factor of at least about 4 and the concentration of said flocculent remaining on said removed sulfur particles is no more than about 0.5 pound per ton of dry sulfur.

37. The method of claim 36 wherein no more than about 20% of said recoved particles have an average diametric particle size at or below about 5.5 microns.

38. The method of claim 37 wherein no more than about 1% of said recovered particles have an average diametric particle size at or below about 2.8 microns.

39. The method of claim 38 wherein at least about 60% of said particles have an average diametric particle size at or above about 11.0 microns.

* * * * *